United States Patent
Mueller et al.

(10) Patent No.: US 12,504,964 B2
(45) Date of Patent: Dec. 23, 2025

(54) ARTIFACT MANAGEMENT INFRASTRUCTURE

(71) Applicant: SAP SE, Walldorf (DE)

(72) Inventors: Florian Mueller, Speyer (DE); Rico Ruszewski, Dresden (DE)

(73) Assignee: SAP SE, Walldorf (DE)

( * ) Notice: Subject to any disclaimer, the term of this patent is extended or adjusted under 35 U.S.C. 154(b) by 185 days.

(21) Appl. No.: 18/301,678

(22) Filed: Apr. 17, 2023

(65) Prior Publication Data

US 2024/0345822 A1 Oct. 17, 2024

(51) Int. Cl.
| | |
|---|---|
| *G06F 8/61* | (2018.01) |
| *G06F 8/65* | (2018.01) |
| *G06F 8/71* | (2018.01) |
| *G06F 9/445* | (2018.01) |
| *G06F 9/455* | (2018.01) |
| *G06F 11/3604* | (2025.01) |
| *G06F 16/00* | (2019.01) |
| *H04L 9/00* | (2022.01) |

(52) U.S. Cl.
CPC . *G06F 8/65* (2013.01); *G06F 8/63* (2013.01)

(58) Field of Classification Search
CPC .......... G06F 8/65; G06F 8/63; G06F 11/3476; G06F 16/284; G06F 16/2379; G06F 11/3089; G06F 16/285; G06F 9/445; G06F 8/38; G06F 11/3692; G06F 8/434; G06F 11/3608; G06F 8/75
USPC ....................................................... 717/168
See application file for complete search history.

(56) References Cited

U.S. PATENT DOCUMENTS

| | | | |
|---|---|---|---|
| 10,732,951 B2* | 8/2020 | Jayanthi | G06F 16/27 |
| 11,971,990 B2* | 4/2024 | Lockman, III | G06F 8/60 |
| 2016/0283225 A1* | 9/2016 | Akbulut | G06F 11/3636 |
| 2017/0180346 A1 | 6/2017 | Suarez et al. | |
| 2018/0121485 A1 | 5/2018 | Jayanthi et al. | |
| 2020/0278877 A1* | 9/2020 | Scrivano | G06F 8/63 |
| 2020/0320189 A1* | 10/2020 | Zhang | G06F 21/54 |
| 2020/0326932 A1* | 10/2020 | Sharma | G06F 8/33 |
| 2020/0374318 A1* | 11/2020 | Polando, Jr. | H04L 63/205 |
| 2021/0248228 A1* | 8/2021 | Nadgowda | G06F 21/572 |
| 2022/0129539 A1* | 4/2022 | Walsh | G06F 21/54 |
| 2023/0325500 A1* | 10/2023 | Patrich | G06F 11/301 |
| | | | 726/22 |

OTHER PUBLICATIONS

Google Cloud, "Storing and retrieving metadata," (Available at https://cloud.google.com/container-anaylsis/docs/store-retrieve-metadata) 5 pages.

(Continued)

*Primary Examiner* — Thuy Dao
(74) *Attorney, Agent, or Firm* — Mintz Levin Cohn Ferris Glovsky and Popeo, P.C.

(57) ABSTRACT

A method, a system, and computer program product for managing container artifacts are provided. An artifact including a container image is received. Validation rules for performing a validation of the artifact are retrieved. Metadata is extracted from the artifact for performing the validation of the artifact. Validation of the artifact is performed by processing the container image using the validation rules and the metadata. The metadata of the artifact is stored, at a database of a registry, for the metadata to be accessible for updates over a lifetime of the artifact.

14 Claims, 7 Drawing Sheets

(56) References Cited

OTHER PUBLICATIONS

OpenMetadata, "OpenMetadata Documentation," (Available at https://docs.open-metadata.org) 3 pages.
Extended European Search Report issued in European Application No. 23193870.5-1203, mailed Feb. 2, 2024, 8 pages.

* cited by examiner

ARTIFACT MANAGEMENT INFRASTRUCTURE

TECHNICAL FIELD

The present disclosure generally relates to distributed computing and, more particularly, to management of artifact related metadata within a distributed data storage system.

BACKGROUND

Container images and other artifacts can be used to distribute and ship software. The structure of a container image can be specified by the open container initiative (OCI) image format specification or the Docker image format specification. The distribution aspects of container images are specified by the OCI distribution specification or the Docker distribution specification, such as artifact, image, blob, manifest, layer, tag, namespace, repository, etc. and related terms, such as base image and parent image. Some storage and distribution concepts do not describe how to securely handle and manage large numbers (e.g., thousands) of container images to ensure compliance with associated rules. If a security vulnerability becomes known, it is essential to quickly and correctly identify all affected container images that can be distributed throughout multiple data centers remotely located from each other. Resolving the challenges to match compliance and security using the OCI distribution specification and Docker distribution specification can raise additional issues during the process.

SUMMARY

Methods, systems, and articles of manufacture, including computer program products, are provided for managing artifact related metadata within a distributed data storage system. In one aspect, a computer-implemented method includes: system includes: one or more processors, and at least one memory storing instructions, which when executed by the at least one data processor, cause operations including: receiving, by the one or more processors, an artifact including a container image, retrieving, by the one or more processors, a plurality of validation rules for performing a validation of the artifact, extracting, by the one or more processors, metadata from the artifact for performing the validation of the artifact, performing the validation of the artifact by processing the container image using the plurality of validation rules and the metadata, and storing, by the one or more processors, the metadata of the artifact, at a database of a registry, wherein the metadata is accessible for updates over a lifetime of the artifact.

In some variations, one or more features disclosed herein including the following features can optionally be included in any feasible combination. In some implementations, the artifact includes a multidimensional binary object. In some implementations, the metadata is extracted synchronously with the validation of the artifact or asynchronously with the validation of the artifact. In some implementations, the operations further include: determining, by the one or more processors, a related artifact, and updating, by the one or more processors, the related artifact based on the updates over the lifetime of the artifact. In some implementations, the metadata is reduced according to one or more security rules before being stored in the database. In some implementations, the updates over the lifetime of the artifact are stored in an audit record. In some implementations, the operations further include: generating notifications including updates about the artifacts and events associated to the artifacts to be transmitted to verified subscribers.

In another aspect, computer-implemented method includes: receiving, by one or more processors, an artifact including a container image, retrieving, by the one or more processors, a plurality of validation rules for performing a validation of the artifact, extracting, by the one or more processors, metadata from the artifact for performing the validation of the artifact, performing the validation of the artifact by processing the container image using the plurality of validation rules and the metadata, and storing, by the one or more processors, the metadata of the artifact, at a database of a registry, wherein the metadata is accessible for updates over a lifetime of the artifact.

In some variations, one or more features disclosed herein including the following features can optionally be included in any feasible combination. In some implementations, the artifact includes a multidimensional binary object. In some implementations, the metadata is extracted synchronously with the validation of the artifact or asynchronously with the validation of the artifact. In some implementations, the computer-implemented method further includes: determining, by the one or more processors, a related artifact, and updating, by the one or more processors, the related artifact based on the updates over the lifetime of the artifact. In some implementations, the metadata is reduced according to one or more security rules before being stored in the database. In some implementations, the updates over the lifetime of the artifact are stored in an audit record. In some implementations, the computer-implemented method further includes: generating notifications including updates about the artifacts and events associated to the artifacts to be transmitted to verified subscribers.

In another aspect, a non-transitory computer-readable storage medium includes programming code, which when executed by at least one data processor, causes operations including: receiving, by the one or more processors, an artifact including a container image, retrieving, by the one or more processors, a plurality of validation rules for performing a validation of the artifact, extracting, by the one or more processors, metadata from the artifact for performing the validation of the artifact, performing the validation of the artifact by processing the container image using the plurality of validation rules and the metadata, and storing, by the one or more processors, the metadata of the artifact, at a database of a registry, wherein the metadata is accessible for updates over a lifetime of the artifact.

In some variations, one or more features disclosed herein including the following features can optionally be included in any feasible combination. In some implementations, the artifact includes a multidimensional binary object. In some implementations, the metadata is extracted synchronously with the validation of the artifact or asynchronously with the validation of the artifact. In some implementations, the operations further include: determining, by the one or more processors, a related artifact, and updating, by the one or more processors, the related artifact based on the updates over the lifetime of the artifact. In some implementations, the metadata is reduced according to one or more security rules before being stored in the database. In some implementations, the updates over the lifetime of the artifact are stored in an audit record. In some implementations, the operations further include: generating notifications including updates about the artifacts and events associated to the artifacts to be transmitted to verified subscribers.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to customization of database tables, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1A:
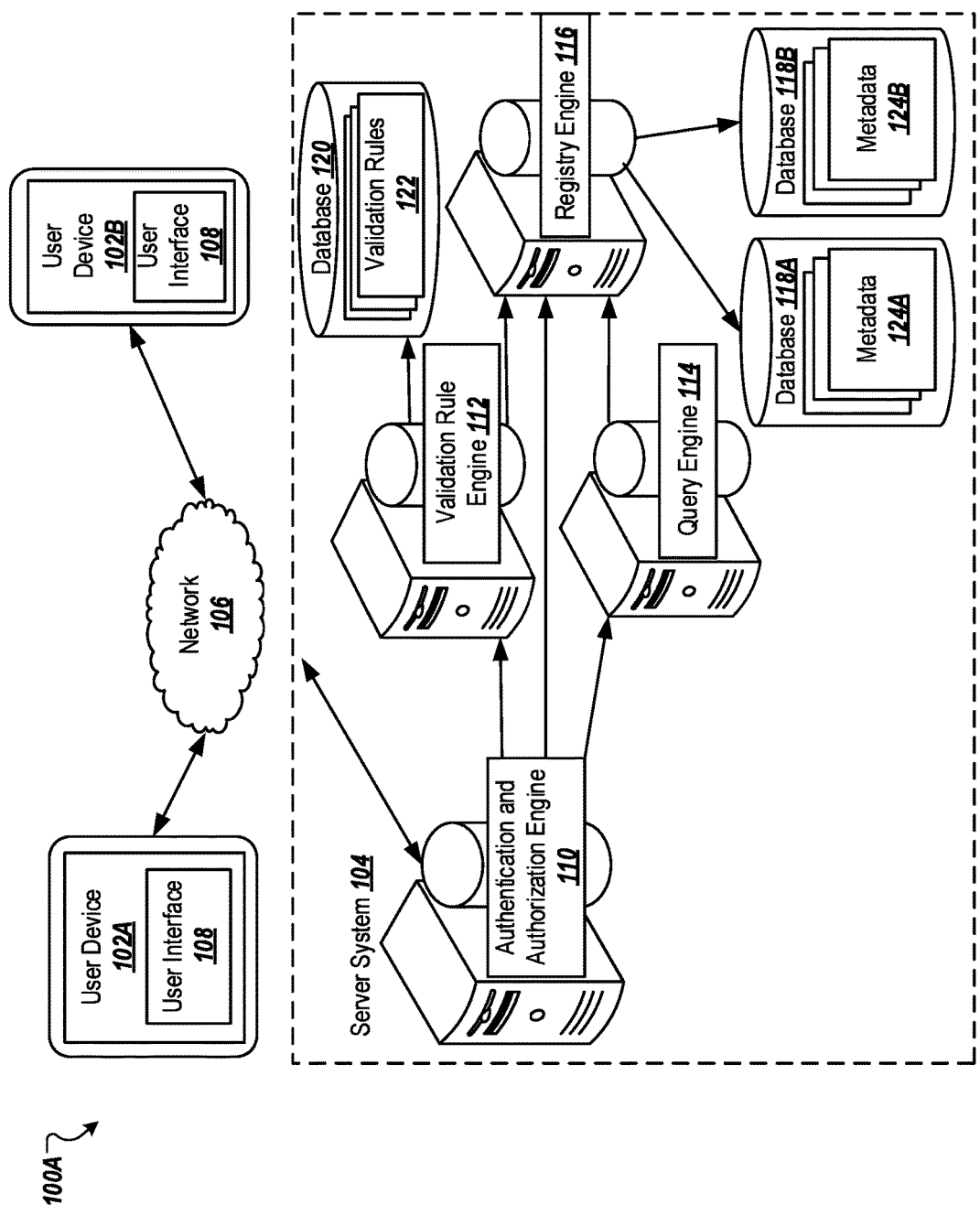
FIGS. 1A and 1B depict diagrams illustrating an example of a system, in accordance with some example implementations.

When practical, like labels are used to refer to same or similar items in the drawings.

DETAILED DESCRIPTION

Implementations of the present disclosure are generally directed to distributed data storage system. More particularly, implementations of the present disclosure are directed to managing artifact related metadata within a distributed data storage system. In a distributed data storage system, distribution of software applications can be based on transfer and tracking of artifacts including container images and other artifacts (e.g., a text file, a Docker image, or a Helm chart), using a set of rules including validation rules. The management of artifact related metadata can be based on validating a received artifact by processing the container image, including packages of software that contain all necessary elements to run the software in any environment. The validation of the received artifact can be based on validation rules, by extracting metadata from the artifact. The metadata to be validated can be from the artifact itself, it can also be metadata coming the request, can be metadata that is stored within the metadata store, or can be metadata from external sources. The metadata associated with the artifact can be stored at a database, where the metadata is accessible for updates over the lifetime of the artifact, including read operations and queries.

In traditional distributed data storage systems, distribution aspects of container images can be specified by the OCI distribution specification or the Docker distribution specification, which can lack updatable metadata making it difficult to track the distribution process. For example, in traditional distributed data storage systems metadata can be in form of labels and annotations included in a separate document associated to the container image, such that changes to metadata require creation of a new container. Another issue of traditional distributed data storage systems is that container images are usually distributed between multiple data centers across the world by using a transfer and replication of container images, without tracking the distribution process, such as by updating associated metadata during the distribution process. OCI provides limited options to add arbitrary metadata to artifacts besides the metadata that is already provided by the container image itself, limiting the possibility to adjust the metadata based on the distribution process.

To avoid the drawbacks of traditional container image-based software application distribution described above, metadata is managed by ensuring compliance with the OCI specification and APIs and keeping it compatible with the distribution specifications of the OCI and Docker ecosystem. In view of the similarities between the Docker registry API and the OCI distribution specification API (OCI API), the implementations described herein with reference to the OCI distribution specification API are applicable to the Docker Registry API. Likewise, the implementations described herein with reference to OCI compliant registry are applicable to the Docker registry. In some implementations, a registry can provide a non-standard, but semantically similar API to the OCI distribution specification API enabling, for example, transmit, retrieve, and delete operations for artifacts. The implementations described herein can be adjusted by someone skilled in the art to cover non-standard APIs and registries as well. Using the described implementations herein, the distribution process provides matching compliance and security for storage and distribution of software artifacts using the OCI and Docker distribution specifications. The described implementations of the distribution process can be implemented by using additional metadata to add, update, correct, and query the respective metadata. The metadata is accessible for updates over the lifetime of the artifact, which are made visible to all customers identified for using the upgrades of the distributed software applications. The visibility of the distribution process, enables elimination of distribution process uncertainties, minimizing incidents and optimizing computational resources involved in mitigating container image issues.

FIG. 1A depicts an example system 100A, in accordance with some example implementations. Referring to FIG. 1, the example system 100A includes user devices 102A, 102B, a server system 104, and a network 106. The user devices 102A, 102B can interact with the server system 104 to transmit an artifact including a container image (e.g., an image manifest, an image index (optional), a set of file system layers, a configuration, or any kind of binary object) into the server system 104 or manage an artifact stored by the server system 104.

The user devices 102A, 102B can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. Even though, not illustrated, in some implementations, multiple user devices 102 including different computing system configurations, such as different operating systems, different processing capabilities, different hardware components, and/or other differences can concurrently request services, from the server system 104. The user devices 102A, 102B can include any combination of fixed and variable computing components. The user devices 102A, 102B can include a user interface 108 to enable an entry of a user input including selection and management operations for artifacts. As shown in FIG. 1, the user devices 102A, 102B can be communicatively coupled, via the network 106, with the server system 104 during an authenticated session to enable data transmission for accessing and managing artifacts.

The server system 104 can include any form of servers including, but not limited to a web server (e.g., cloud-based server), an application server, a proxy server, a network server, and/or a server pool. In general, the server system 104 uses an authentication and authorization engine 110, a validation rule engine 112, a query engine 114, a registry engine 116 and databases 118A, 118B, 120. The authentication and authorization engine 110, the validation rule engine 112, the query engine 114, and the registry engine 116 can include one or more processors configured to perform operations related to container image distribution. For example, the validation rule engine 112 can include one or more processors configured to authenticate user inputs, received from the user devices 102A, 102B, including or related to a container image. The validation rule engine 112 can include one or more processors configured to validate the container image using validation rules 122 stored by the database 120. The query engine 114 can include one or more processors configured to extract a new metadata of the container image or identify a previously generated metadata associated with the container image, by using the registry engine 116. In some implementations, the query capabilities are limited to listing artifact tags. The registry engine 116 can include one or more processors configured to store the new metadata 124A, 124B, at a database 118A, 118B of a registry. The metadata 124A, 124B is accessible, through the registry engine 116, for updates over the lifetime of the container image. The registry engine 116 can include an interface to interact with the metadata 124A, 124B, stored at a database 118A, 118B, for example to modify or delete the metadata 124A, 124B.

The databases 118A, 118B, 120 can include a cloud database system environment, such as, Analytics Cloud (SAC) Data Warehouse Cloud or High performance Analytic Appliance (HANA), as available from SAP AG, Walldorf, Germany although other types of databases can be used as well. In some implementations, the databases 118A, 118B, 120 can include an on-premise database system (e.g., system databases, tenant databases, etc.), servers (e.g., name server(s), index server(s), script server(s), etc.). The databases 118A, 118B, 120 can store metadata 124A, 124B and validation rules 122, respectively that can be accessible (e.g., via queries, procedure calls, etc.) by the registry engine 116, the validation rule engine, and, optionally, by the user devices 102A, 102B. The metadata 124A, 124B and other sources stored by the databases 118A, 118B can be queried to identify artifacts but can also be used to check the validity of an artifact, using the validation rules 122 stored by the database 120, when it is transmitted, retrieved, deleted, etc. An "invalid" artifact may be rejected, disabled, tagged, archived, deleted, etc., if necessary. In most cases, the owner of an artifact is notified if an artifact has been identified as "invalid". The databases 118A, 118B, 120 can include a runtime database that holds most recent metadata 124A, 124B and validation rules 122 to enable validated and trackable distribution processes of container images. The databases 118A, 118B, 120 can include a multitenant database architecture (e.g., multitenant database containers (MDC)), such that each tenant of the server system 104 (using a respective user devices 102A, 102B) can customize respective metadata 124A, 124B and validation rules 122 stored by the databases 118A, 118B, 120 and can be served by separate portions of the server system 104. Data from each tenant of the example system 100A (e.g., Tenant A and/or Tenant B) can be organized into one or more data partitions and stored in at least one data container. Furthermore, each data partition can be stored in one or more of the plurality of computing nodes included in the example system 100A configured as a distributed data storage system.

The network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

Figure 1B:
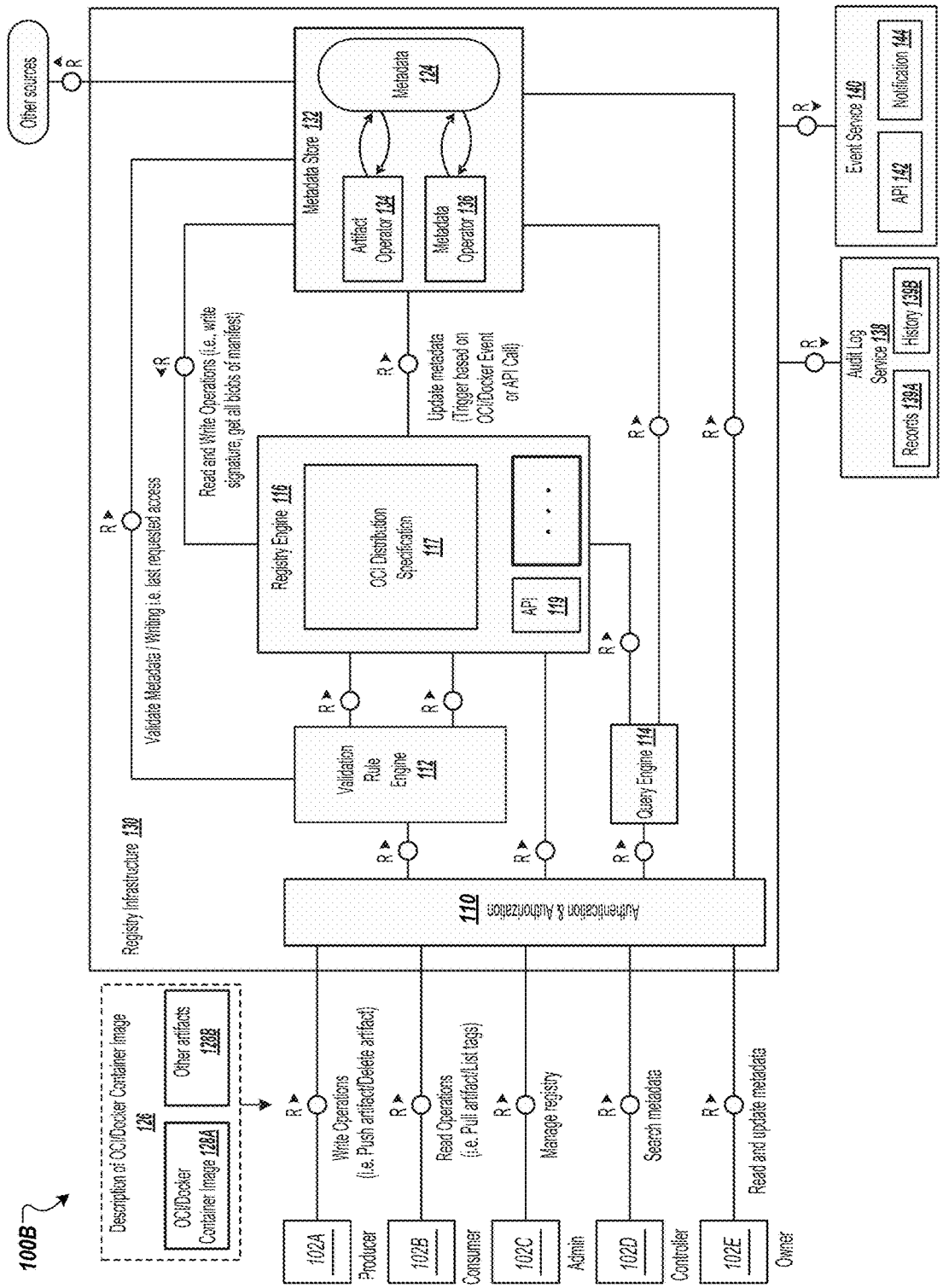

To further illustrate, FIG. 1B depicts a block diagram describing an example system 100B of the example system 100A. The illustrated example system 100B is configured for storing, retrieving, and deleting artifacts 128A, 128B.

The example system 100B includes a registry infrastructure 130. The registry infrastructure 130 can be compliant with the OCI Distribution Specification. For example, the registry infrastructure 130 can at least implement a retrieve endpoint (e.g., user device 102B), can support at least one transmit method (e.g., to user device 102A) and, optionally, can implement other parts of the OCI distribution specification. The registry infrastructure 130 can include the authentication and authorization engine 110, the validation rule engine 112, the query engine 114, a registry engine 116, and a metadata store 132. In some implementations, except from the registry engine 116 and the metadata store 132, all other components (engines) of the registry infrastructure 130 can be optional. The authentication and authorization engine 110, the validation rule engine 112, the query engine 114, and the registry engine 116 can be included in a single server system (e.g., server system 104 described with reference to FIG. 1A) or can be distributed over multiple server systems.

The validation rule engine 112 can be configured to check incoming and outgoing artifacts 128A, 128B and requests received from a plurality of user devices 102A-102E, acting as producers 102A of artifacts 128A, 128B, consumers 102B of artifacts 128A, 128B, administrators 102C of artifacts 128A, 128B, controllers 102D of artifacts 128A, 128B, or owners 102E of artifacts 128A, 128B. For example, the validation rule engine 112 can be configured to process descriptions of OCI or Docker container images 126 including OCI/Docker container image 128A or other artifacts 128B (e.g., Software Bill of Materials, SBOM) received from one of the user devices 102A-102E. The validation rule engine 112 can be connected to the API 119 endpoints and registry engine 116. Before artifacts 128A, 128B are sent to the registry engine 116, the artifacts 128A, 128B can be processed by the validation rule engine 112. The validation rule engine 112 can have any of the following tasks: checking rules, extracting metadata 124 from the artifact 128A, 128B, extracting metadata 124 from the request, generating additional metadata 124, and update metadata 124.

With continued reference to FIG. 1B, functions of the example system 100B are being described. Within the context example, the owner of an artifact 128A, 128B can include a person or group of entities that is responsible for the artifact 128A, 128B. If an artifact 128A, 128B becomes invalid, gets insecure, deleted, archived, etc., the user device of the owner person or group gets notified by the event service 140. Implementations may include multiple methods to determine the owner 102E of an artifact 128A, 128B. For example, the owner identifier can be attached to the artifacts 128A, 128B, when it is transmitted, for example, in a container image annotation. In other examples, the owner 102E can be determined from the namespace the artifact 128A, 128B resides in. The user device 102E of the owner can be allowed to display and process user input to update selected metadata of the owned artifacts 128A, 128B. The authorization control can be implemented to be configuration particular. A producer can have a user device 102A that can be configured to transmit an artifact 128A, 128B into the registry infrastructure 130 or can delete an artifact 128A, 128B. The producer can be a human user or a technical user of the user device 102A. For example, a technical user may transmit an artifact 128A, 128B as part of a CI/CD pipeline step. The producer may or may not be the owner of an artifact 128A, 128B. A consumer is a human user or a technical user of the user device 102B who has read access to (portions of) the metadata store 132. In some implementations, the user device 102B of the consumers only retrieve artifacts 128A, 128B from the metadata store 132. For example, a technical user can be a Kubernetes cluster retrieving a container image. The admin or administrator user of the user device 102C controls and configures a portion of the server system 104. Implementations may choose to support multiple different admin roles. For example, the admin can be a system admin who oversees the whole server system 104 (including setting up authentication and authorization engine 110). As another example, the admin can be a namespace admin user who can only define the rule set of a particular namespace. The controller has access to the query engine 114 and can at least query the registry engine 116 and the metadata store 132. Implementations may also allow querying the audit log service 138 or external sources that can be linked to artifacts 128A, 128B in the server system 104.

The validation rule engine 112 can process artifacts 128A, 128B to differentiate between valid and invalid artifacts. The concept and the terms "valid" and "invalid" can be changed and extended according to particular implementations. In some implementations, the validation rule engine 112 can classify artifacts as "valid for production", "valid for testing," or "invalid." A "valid artifact" can be an artifact that complies with all rules that are relevant for the artifact 128A, 128B. The relevant rule set may depend on, for example, the namespace, the owner, access rights, etc., the exact same artifact may be, for example, valid in one namespace and invalid in another space. Invalid artifacts can be an artifact that fails to comply with one or more rules and is not be accessible. Invalid artifacts can be accessible by system administrators 102C and the artifact owner 102E, respectively their delegates. Invalid artifacts can be identified by the validation rule engine 112 or the query engine 114. For example, invalid artifacts can be identified by the query engine 114 in general query results or in query results of a group. The query engine 114 can provide validity information for each artifact 128A, 128B in the result set, indicating if the artifact 128A, 128B is valid or invalid. Validity of artifacts 128A, 128B can change over time. For example, valid artifacts 128A, 128B can become invalid over time (or invalid artifacts 128A, 128B can become valid), if the rule set changes or rules within the relevant rule set are updated, if artifacts 128A, 128B are moved, or if rules depend on time conditions, or if artifacts 128A, 128B have an expiration date. In some implementations, an artifact can be configured to be transmitted within a time interval to the system and can become accessible through the OCI API starting with a particular date that has been defined by the artifact owner 102E. To avoid that invalid artifacts become unintentionally valid, an implementation may provide a flag that marks an artifact as invalid even if it complies with all rules. The artifact 128A, 128B owner 102E can be in charge of setting and removing the invalidity flag. In some implementations, the validation rule engine 112 can apply a rule set is when the status of the artifact 128A, 128B changes. For example, if an artifact 128A, 128B becomes invalid, the validation rule engine 112 can trigger actions for the artifact to be moved, deleted, tagged, and/or archived. Some of the actions can include changes in the metadata store 132, and other actions can move the artifact 128A, 128B to a different place. A status change on an artifact 128A, 128B may also affect related artifacts. For example, if a container image becomes invalid, the artifact 128A, 128B that holds a signature of the respective image can become invalid, too, and the same actions may be applied to the related artifact 128A, 128B.

The validation rule engine 112 can be configured to prohibit an artifact 128A, 128B related action, if necessary. The validation rule engine 112 can be configured to transmit, through the validation rule engine 112 and registry engine 116, validated artifact data to the metadata store 132 with artifact 128A, 128B data or metadata 124. The validation rule engine 112 can be connected to the API 119 endpoints and registry engine 116. Before artifacts are stored in the registry engine 116, they are processed by the validation rule engine 112. The validation rule engine 112 can perform any of the following tasks: checking rules, extracting metadata 124 from the artifact 128A, 128B, extracting metadata 124 from the request, generating additional metadata 124, and update metadata 124.

The query engine 114 can be configured to allow querying the metadata store 132, the registry engine 116, the audit log service, and a remote query engine(s) 114 of other registry infrastructures or server systems. The query engine 114 provides an API to query the registry engine 116 and the metadata store 132 at the same time. In some implementations, results from the audit log service 138 can be included to query historical data and statistics and/or may include other services in the example system 100B. The interaction with the query engine 114 can depend on a use case of the artifact 128A, 128B and/or the metadata 124. For example, the query engine 114 may provide a query formatted as a query language like SQL for administrator user devices 120C and controller user devices 102D and can generate a self-explanatory query to be displayed by a user interface of producers 102A, consumers 102B, and/or owners 102E. The query engine 114 can provide a dashboard that provides statistics and insights into the example system 100B in different granularity for different user groups—from producer user devices 102A to administrator user devices 120C and controller user devices 102D. In some implementations the query engine 114 may have reporting capabilities in addition to predefined queries and provides the output on demand, automatically in regular intervals, or when an event occurs. The query engine 114 can be used for many different use cases. Different user devices, such as user devices of artifact owners, security teams, and bots for automated processes can interact with the query engine 114. Artifact owners may use the query engine 114 to get the determined metadata and status of their artifacts. Security teams may use the query engine 114 to find vulnerable artifacts across parts or the whole system 100B based on different criteria and get statistics. Bots may use the query engine 114 to generate an output for external processes, for example copying container images to other container image registries.

The metadata store 132 can include a database (e.g., database 118A, 118B, 120) containing data about the artifacts 128A, 128B stored in the registry. The metadata store 132 can provide an interface to interact with the data, such as the metadata 124. The artifact operator 134 can generate (in the background, among other things) artifacts 128A, 128B that are related to transmitted artifacts 128A, 128B (e.g., signatures, SBOMs, etc.). The metadata store 132 can collect metadata 124 about artifacts 128A, 128B without changing the OCI API and without changing clients calling the API. The metadata 124 is stored in the metadata store 132 and can be read, added, updated, and removed at any point in time. The primary key for a metadata record can be the digest of the artifact 128A, 128B. The registry engine 116 can normalize the digest by using only one hash algorithm for the keys. The received metadata 124 can be stored, in the metadata store 132, as-is, enhanced, or reduced. For example, if an artifact including a container image manifest is transmitted, the registry engine 116 can compare the layers of the container image with an internal or external database of known layer digests. If the registry engine 116 can find a matching layer, the container image is based on the found container image and the information may be enhanced when being stored in the metadata store 132. Metadata 124 can also be reduced for, for example, privacy reasons. For example, storing the IP address of a retrieve request for a longer period cannot be allowed. If the IP address is only used to determine the region or country the request is coming from, storing the country instead of the IP address can be sufficient. If the metadata 124 is changed, deleted, or added later, the operation and previous values can be recorded by the audit log service 138 to store the associated history. In some implementations, the metadata store 132 can select the metadata 124 to be recoded according to a particular configuration. The metadata 124 can be different from annotations in container image manifests in many ways. Annotations are fixed to avoid changes to the digest of the container image and thereby changes its address. Annotations can be included in the container image to enable the annotations to be automatically transmitted with the container image when it is moved or copied—even outside the server system 104. To prevent some annotation values from being queryable through the query engine, the annotation values can be excluded from storage in the metadata store. The annotations can be stored as metadata 124 in the metadata store 132. The metadata store 132 can include an artifact operator 134 and a metadata operator 136. The metadata store 132 can use the metadata operator 136 and the artifact operator 134 to execute asynchronous operations on the metadata 124 and the artifacts 128A, 128B.

The artifact operator 134 can manage artifacts 128A, 128B, such as disable, tag, archive, delete, or perform other operations on the artifacts 128A, 128B, if necessary. The artifact operator 134 can create, change, and delete artifacts in the registry engine 116. Any of the metadata operator 136 and the artifact operator 134 can be triggered by changes in the registry engine 116 or metadata store 132 or any event in the example system 100B. After a container image manifest has been transmitted, a new artifact 128A, 128B containing the signature of the manifest can be created by the artifact operator 134 and stored in the registry engine 116. The metadata operator 136 can retrieve the signature artifact and link it to the manifest by adding the appropriated metadata 124. In some implementations, SBOM (Software Bill of Materials) can be generated and stored in the metadata store 132. An update of metadata 124 can mark a container image as productive, and the artifact and its related artifacts can be triggered to be moved into the appropriate namespace. The artifact operator 134 can detect the event and can execute the move of the artifact to the appropriate namespace. In some implementations, the actions of the artifact operator 134 and/or of the metadata operator 136 can be defined by a rule set.

The metadata operator 136 can generate (in the background, among other things) metadata 124. The metadata operator 136 can manage metadata, such as add and update metadata 124 in the metadata store 132. The metadata operator 136 adds and updates metadata 124 in the metadata store 132 asynchronously. The metadata 124 can be added, updated, or deleted in the metadata store 132, in response to triggers such as an event in the example system 100B. The metadata 124 can be added, updated, or deleted in the metadata store 132, in response to triggers set at regular intervals, for example to account for expiration dates and similar metadata values that depend on time values. Because the operation of the metadata operator 136 can be outside the API flows (in contrast to the Validation rule engine 112), it can be used for long-running processes and evaluations. The metadata operator 136 can process data received from internal and external data sources that are not always available. The metadata operator 136 can be similar to the validation rule engine 112 and can use the same rule sets and the same logic to identify the appropriate rule set. The main difference can be that the metadata operator 136 can run in the background and therefore cannot reject API 119 calls. To compensate that, implementations may choose to mark all incoming artifacts 128A, 128B as "invalid" until the metadata operator 136 has processed the artifact.

The registry infrastructure 130 can be configured to be connected to an audit log service 128 and an event service 140. The audit log service 128 records 139A of activities in the system 100B and can keep a history 139B of changes to the metadata 124. The audit log service 138 may be searchable via the query engine 114. The purpose of the audit log service 138 can be to keep an immutable snapshot of the history 139B of the artifacts 128A, 128B including all modifications in the system 100B including the changes to the metadata 124. The history 139B can be used in case of a security incident that involves one of the artifacts 128A, 128B. For example, if a request is rejected, the notification can include an OCI compliant error message that can be sent to the client (user device 102A, 102B). The OCI compliant error message can include the OCI error code DENIED.

The event service 140 can include an application programming interface (API) 142 and notifications 144. The event service 140 can enable external parties to be notified of any changes in the metadata 124 stored in the metadata store 132. For example, the event service 140 can send a notification 144 to an artifact owner user device 102E when an artifact becomes invalid or has been deleted from the metadata store 132. If an artifact 128A, 128B changes its state from valid to invalid and vice versa, the artifact owner 102E and/or producer 102A can be notified through the event service 140. The event service 140 can provide reports about valid and invalid artifacts 128A, 128B, which may be generated regularly or on demand. In some implementations, the reports can be provided through an API 142 and/or through a notification module. The event service 140 notifies external parties about activities, metadata, and status changes. The components in the system 100B can notify the event service 140 when a relevant artifact related event happens. The definition of "relevant" can depend on one or more factors. External parties can subscribe to events and get notified based on their subscription, which may provide filters for particular artifacts 128A, 128B, namespaces, metadata values, etc. The system 100B and in particular, the event service 140 can be configured such that receivers only receive notifications about the artifacts 128A, 128B and events the subscriber is allowed to receive. For example, artifact owners 102E can be able to get all notifications that touch the artifacts 128A, 128B they own, but not about artifacts they do not own. The notifications 144 may be provided using one or more notification channels, for example, email, pub-sub services, web hooks, etc. Notification receivers can be user devices of humans (e.g., artifact owners) and/or bots (technical users) that may use the events to automatically trigger external tools or workflows.

The example system 100A including the example system 100B can be configured to manage a large the number of artifacts 128A, 128B that can be identified based on different criteria. For example, if a security threat in a base or parent container image becomes known, finding all container images that are based on the base or parent container image can be essential, to address the issue comprehensively across all affected applications. The described implementation adds a metadata store 132 to the registry infrastructure 130, which is kept up to date without altering or enhancing the OCI Distribution API. The existing clients can interact with the registry infrastructure 130 as usual, using the same tools and libraries and at the same time the metadata store 132 is populated with the respective metadata 124. The metadata 124 can be extracted from the artifact 128A, 128B and/or related artifacts and/or API requests and/or other sources. The extraction may happen synchronously when the artifact is loaded (transmitted) into the system and/or asynchronously in the background. Metadata 124 can also be updated over the lifetime of an artifact 128A, 128B. The management of the metadata in association with a container image distribution process is further described in detail with reference to FIGS. 2A-2C and 3.

In some implementations, the example systems 100A, 100B or portions of multiple example systems 100A, 100B can be federated. The level of autonomy and synchronization between federated registry infrastructures 130 may vary from implementation to implementation. Federated registry infrastructures 130 can be: externally managed, fully synchronized, and partially synchronized as described in detail with reference to FIGS. 2A-2C. The built-in federation can either be a fully synchronized federation or a partially synchronized federation.

Figure 2A:
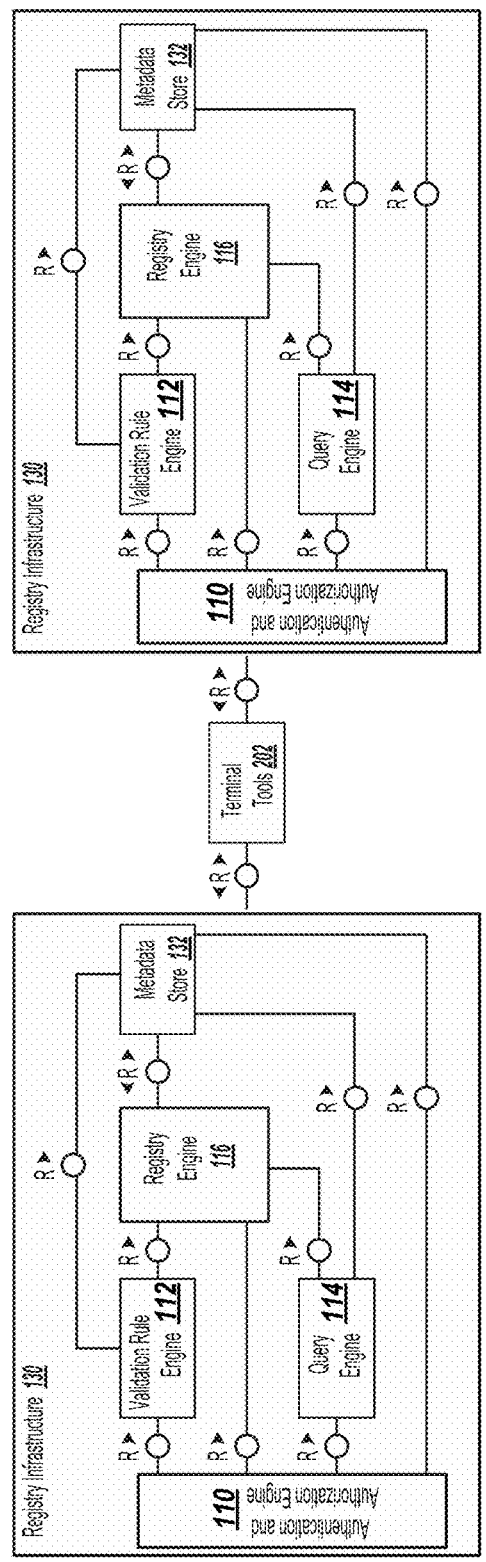
FIGS. 2A-2C depict examples of system federations, in accordance with some example implementations.

FIG. 2A depicts a block diagram illustrating an example of an externally managed federation 200A, in accordance with some example implementations. The externally managed federation 200A can include multiple registry infrastructures, such as the registry infrastructure 130 described with reference to FIG. 1B. The registry infrastructures 130 included in the externally managed federation 200A do not share any private data or operation logic and do not know about each other. For example, the externally managed federation 200A excludes built-in managed data exchange between different portions of the registry infrastructures 130. To exchange data, users of the registry infrastructures 130 are required to manage external tools 202 configured to interact with the outbound communication channels of the registry infrastructures 130. The tools 202 include coupling that enable large entities (e.g., organizations with distributed data storage systems) to manage artifacts (e.g., artifacts 128A, 128B described with reference to FIG. 1B) across their network and/or organization.

Figure 2B:
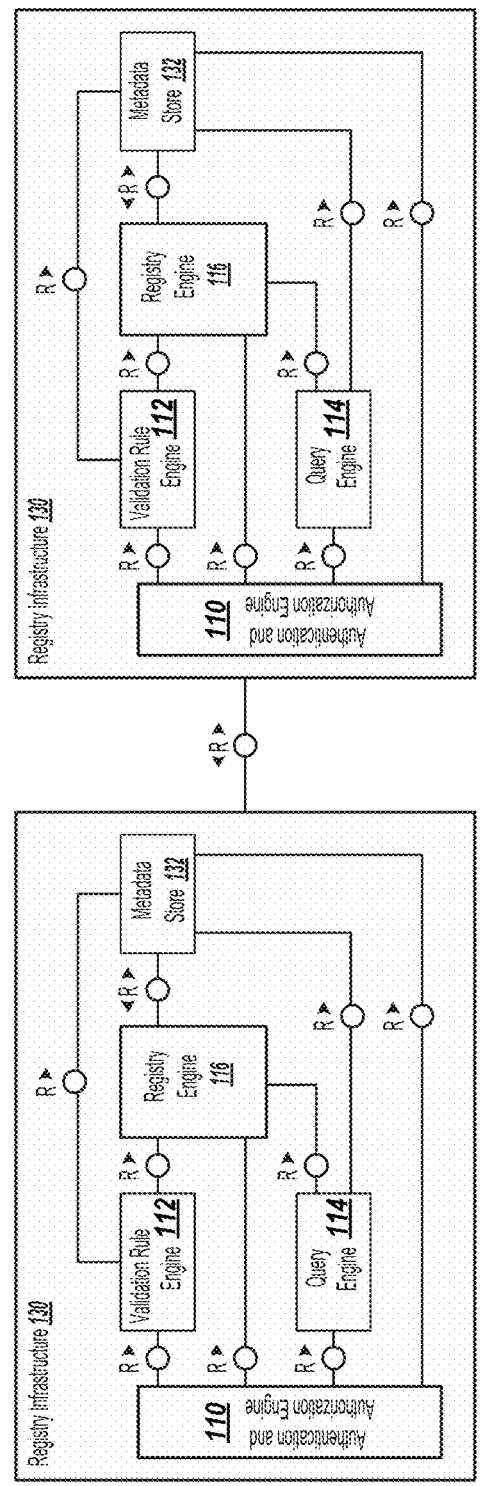

FIG. 2B illustrates an example of a fully synchronized federation 200B, in accordance with some example implementations. The fully synchronized federation 200B can include multiple registry infrastructures, such as the registry infrastructure 130 described with reference to FIG. 1B. The registry infrastructures 130 included in the fully synchronized federation 200B can be built-in federation, meaning that no external tooling (e.g., tool 202 described with reference to FIG. 2A) is required to share data across different portions of the registry infrastructures 130. The fully synchronized federation 200B can be configured to enable multiple registry infrastructures 130 to be tightly coupled to each other and share the same information. For example, the data can be exchanged between all registry infrastructures 130. The coupling can include filters that filter information based on associated requirements of the registry infrastructures 130.

Figure 2C:
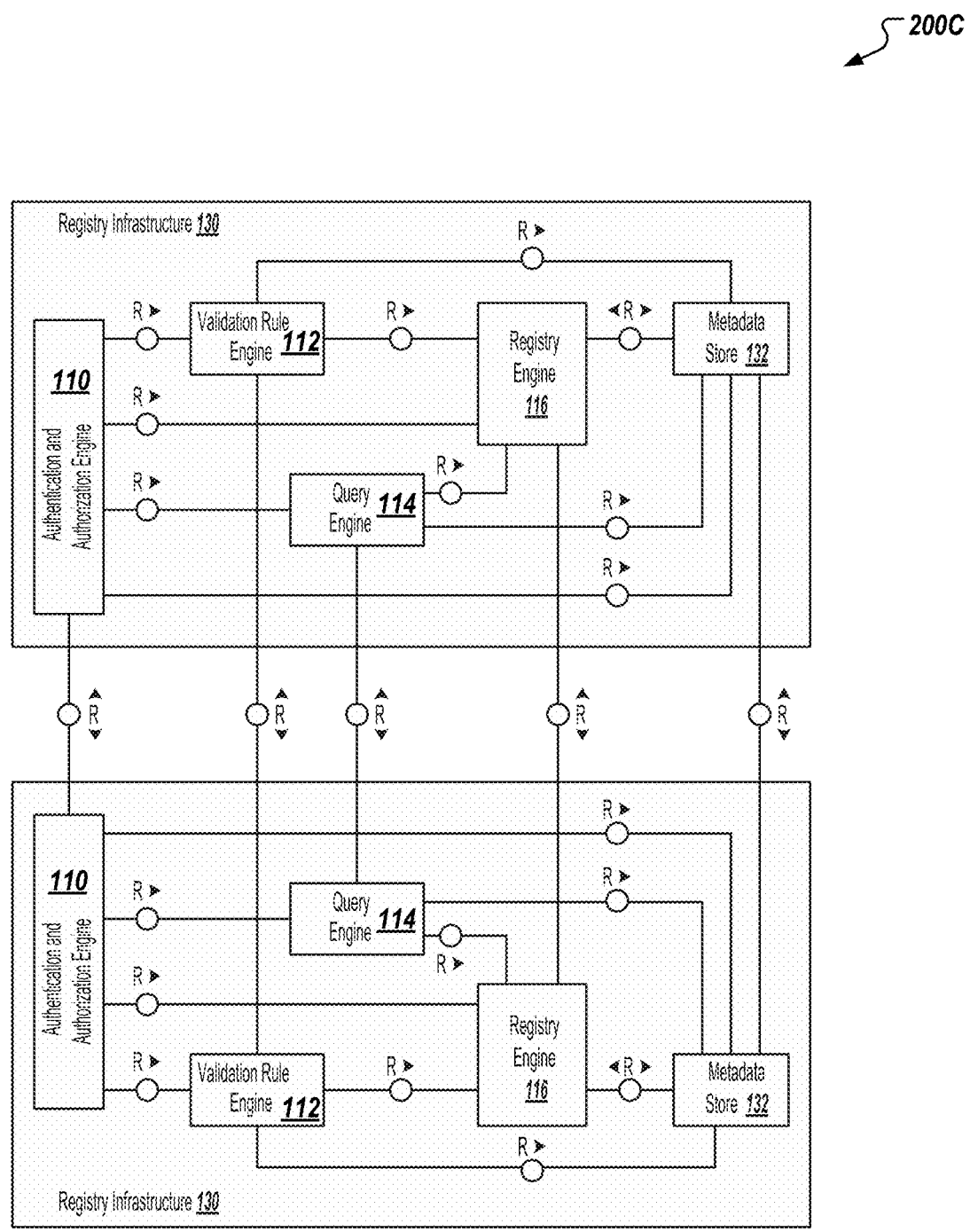

FIG. 2C illustrates example of a partially synchronized federation 200C, in accordance with some example implementations. The partially synchronized federation 200C can include multiple registry infrastructures, such as the registry infrastructure 130 described with reference to FIG. 1B. The registry infrastructures 130 included in the partially synchronized federation 200C can be configured such that only a subset of data is set to be shared across different portions of the registry infrastructures 130. Each and any portion of the partially synchronized federation 200C can exchange information with other portions of the registry infrastructures 130. An example of partially synchronized authentication and authorization can include a user device of an admin including a namespace within a registry infrastructure 130. The user management can be shared with other registry infrastructures 130 to assign the user to also be an admin on all other registry infrastructures 130, without having the same authorization towards namespaces. In an example of partially synchronized validation rule engine 112, each instance may share a common set of validation rules. In an example of partially synchronized query engine 114, a query engine 114 of an instance may be able to provide all artifacts of a particular owner, but the query engine 114 can also request the information from all other registry infrastructures 130 to provide a full set of information across the landscape. In another example of partially synchronized registry engine 116, some artifacts may be shared across all registry infrastructures 130 independent of the registry infrastructure 130 of origin. The application container images can be built on top of parent container images. The baseline container images can be available in all registry infrastructures 130 whereas application container images are only available where they are required. In an example of partially synchronized metadata store 132, some metadata may be shared to other registry infrastructures 130. For example, a namespace once created within a single registry infrastructure 130 can be reserved within all registry infrastructures 130 to reserve the namespace in other registry infrastructures even if an entity having a namespace in one infrastructure does not need the namespace in other infrastructures yet. Once the entity requires the namespace in other infrastructures, the reserved namespace can be used. More information regarding the processes executed by the registry infrastructures 130 is provided with reference to FIG. 3.

Figure 3:
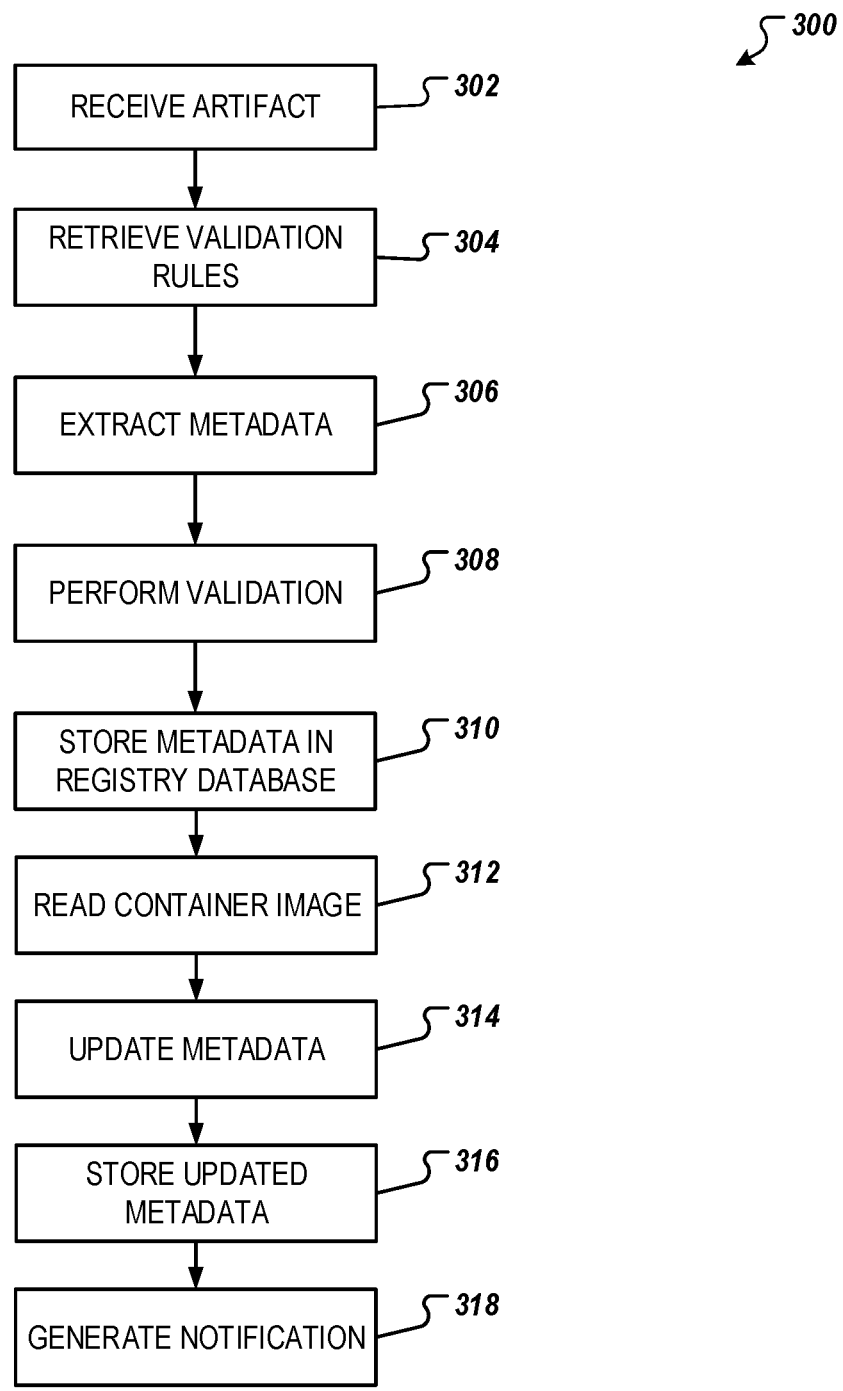
FIG. 3 depicts an example process, in accordance with some example implementations.

FIG. 3 depicts a flowchart illustrating a process 300 for managing artifact related metadata in accordance with some example implementations. The process 300 can be executed by the example systems 100A, 100B shown in FIGS. 1A and 1B, using the example federations 200A, 200B, 200C shown in FIGS. 2A-2C, the system 400 shown in FIG. 4 or any combination thereof.

At 302, an artifact including a container image is received. The artifact can include a multidimensional binary object, such as a set of file system layers or a configuration. The container image can include an image manifest and/or an image index, such as an OCI or Docker container image. The artifact can be received by a server system (e.g., a server system described with reference to FIG. 1A) or a portion of the server system, such as a registry infrastructure (e.g., registry infrastructure 130 described with reference to FIG. 1B). For example, a producer of the container image can be authenticated, by an authentication and authorization engine of the server system. The authenticated artifact producer can send the container image as an OCI container image into a namespace with assigned writing access. The received container image (static file of executable code that can create when executed a container on a computing system) can be send to a validation rule engine for validation.

At 304, validation rules are retrieved for performing a validation of the artifact. The validation rules can define the conditions of a valid artifact. The validation rules can be retrieved, by a validation rule engine (e.g., validation rule engine 112 described with reference to FIGS. 1A and 1B, from a database. The validation rule engine can perform any of the following tasks: checking rules, extracting metadata from the artifact, extracting metadata from the request, generating additional metadata, and update metadata. To check if the action triggered by an API request can be permitted, the validation rule engine first identifies which rule set to use. A rule set can include one or more rules that can be used to verify whether the artifact passes the validation. The rule set may depend on a variety of criteria. For example, the namespace the artifact content can be transmitted to may be a criterion. According to another example criterion, the namespace match can be limited to exact matches, may follow a defined pattern or a regular expression, or something similar. As another example criterion, different producers/users of the user devices transmitting the content may need to follow associated rules. For example, human users and technical users may have different rule sets. The origin of the request may determine the rules set. For example, requests from a particular IP range may follow a tighter rule set or may be rejected completely. In some implementations, the validation rule engine can use a rule set for all scenarios, or it can use different rule sets associated to different scenarios. For example, in a large data distribution system some administrators can only see and adjust a particular set of rule sets. The system may be set up in a way that administrators are responsible for particular namespaces and the rule sets are associated to these namespaces. Once the rule set can be determined, the rules within the rule set can be retrieved for validation. The validation rule engine can have access to all incoming request data (HTTP header and body, client IP, etc.), to all data in the registry, all data in the metadata store, other internal or external data sources, and can use the query engine to retrieve data used for validation.

At 306, metadata is extracted, by the validation rule engine, from the artifact and/or the metadata store to validate the received container image. For example, in response to determining that the artifact is missing an associated metadata, metadata is generated from the artifact. For example, the annotations of the container image and the data associated with the request (e.g., location of request origin) can be extracted from the artifact and/or related artifacts and/or API requests and/or other sources. The validation rule engine may use annotations from a manifest, data from a content descriptor, the digests, a size of layer, and/or data from a container image configuration. The validation rule engine can be configured to handle non-standard formats of the artifact to extract the metadata from the artifact and/or related artifacts and/or API requests and/or other sources. In some implementations, the container image includes an annotation to identify whether the container image has been built with Buildpacks or with a Dockerfile. Extracting metadata from the request can include metadata that is not a part of the artifact itself, but part of the request. For example, the date and time of the request or the user making the request or from where the request can be made (IP address). The data may be relevant for the evaluating rules (at the time of the request and/or later) and can include important metadata that can be stored in the metadata store. The validation rule engine may also generate additional metadata. For example, the validation rule engine may format (reduce and/or expand) the metadata by using data from other internal and/or external source. Metadata may be adapted before it gets stored to, for example, save space, normalize the data, make it more findable, speed up rule evaluation, and/or comply with legal regulations.

At 308, validation is performed. The container image (e.g., a portion of container image or the entire container image) can be processed, by the validation rule engine, by using the validation rules and the metadata. The validation can include checks if the uploaded content matches the rule set of the respective namespace corresponding to the authenticated user of the user device. If the extracted metadata does not match the associated rule set retrieved by the validation rule engine, the artifact can be determined as invalid and the request associated with the artifact can be rejected. The metadata can be used to determine whether the artifact is valid (request can pass) or is invalid (request is rejected). An implementation may be able to optimize the rule evaluation to avoid timeouts by, for example, keeping all necessary data in a cache, having particular indices, or per-evaluate parts of the rule set, where possible. Rule evaluation optimization can work for read requests, but might not work for write requests for which the system processes the newly provided data which can be large and time consuming. Depending on the request and the data, the evaluation may be deferred, and incoming data may be stored but locked. The deferred data is unavailable for standard read operations, for example through the OCI API, but may be visible and manipulatable through admin APIs. Because the OCI API does not support asynchronous requests, the validation rule engine can be configured to intercept the request synchronously, such that the client waits until the evaluation takes place. The system can be configured to prevent the evaluation from exceeding a set time period. In some implementations, the lock can include a flag in the registry engine and/or the metadata store, or locked artifacts may be stored in a different part of the system, or something similar. The deferred evaluation may be done by the metadata operator and/or artifact operator. If the evaluation passes, the artifact can be unlocked and becomes available. Some write operations may support upload of data in grouped portions of the artifacts. For example, some variations of transmit operations in the OCI API can be designed to upload multiple portions of the artifacts in multiple parts. The validation rule engine may evaluate each grouped portion separately and/or the final completed portion of the artifact. The registry engine system may process grouped portions of the artifacts and may mark them as valid or invalid until the validation of all the data associated with the artifact is complete and passes the rules (e.g., security rules, compliance rules, law derived rules, and/or organizational, state, federal or national other rules). To meet the compliance rule of the organization, each container image can be required to have a signature.

At 310, the metadata of the artifact is stored, at a database of a registry, where the metadata is accessible for updates and queries over the lifetime of the artifact. The extracted metadata can be not only used for validation but also sent to the metadata store to be stored. The metadata store saves the data in an allocated database. The metadata can be formatted using a default configuration in the metadata store. In some implementations, the artifact operator automatically creates a signature artifact of the container images and stores the artifact alongside the container image. In response to storing the artifact alongside the container image, the metadata can be updated accordingly, and the metadata operator can reevaluate the container image, mark it as valid, and store the associated metadata in the metadata store. The lifetime of the artifact (container image) refers to the time period starting when the artifact is transmitted to the infrastructure until the replacement of the artifact.

At 312, an artifact (e.g., a container image) is retrieved from the registry database to be read, causing a metadata update to be triggered for an existing artifact. The retrieve of the artifact can activate a validation process, to be conducted by the validation rule engine, using validation rules. For example, a consumer of a container image authenticates with the system and requests the retrieve of a container image with a standard OCI client to update the container image. To validate the retrieve of the container image, the validation rule engine checks if the request matches a set of rules. To validate the request, the validation rule engine extracts metadata from the request and the metadata of that requested container image from the metadata store. In case the container image can be marked as invalid and the requestor has not an owner role, the request can be rejected. In the case, the container image can be valid. The last access date and time can be recorded in the metadata store (and indirectly in the history of the audit log service). The additional data helps administrators and container image owners to understand whether a container image can be still in use or not and when and how often (via the audit log service) it has been accessed. The container image can only be retrieved if the container image is not yet archived. If the example container image was not archived, the request can be accepted and forwarded to the registry engine. As another example, if a consumer of a container image authenticates with the system and requests the retrieve of a container image with a standard OCI client by using a tag, the rule set of that namespace mandates that container images can be addressed by digest only. The request can be rejected. As another example, a namespace admin authenticates with the system and configures the namespace for its service. To configure the namespace, the namespace admin creates two paths (sub-namespaces) to distinguish between development and production artifacts. For the development path, the namespace admin configures an access timeout as a rule in the namespaces rule set. If there can be no access within the timeframe, the container images are automatically deleted by the metadata operator. For the production path, the namespace admin configures a default replication to another system to ensure high availability of production container images. The replication can be executed by the artifact operator. The namespace admin also changes the owner setting for the namespace. That is, artifacts transmitted to the namespace can be automatically assigned to a particular user or group. Because the setting can be changed, the metadata of all artifacts in the namespace need to be updated with the new owner. The request can be executed by the metadata operator in the background.

In some implementations, the artifact update request can include a delete request for a container image to be deleted. A container image owner authenticates with the system and wants to delete a container image. The organization can be configured to request that valid container images are marked as archived and become invalid for six months before they can be finally deleted. Container images that are marked as archived for more than a year, can be automatically deleted. The policy can be implemented in a rule set. If the container image to be deleted is not marked as archived, the validation rule engine can mark the container image as being invalid. The artifact operator moves the container image and all related artifacts into an archive storage. If the artifact to be deleted includes a container image be marked as archived and a set (e.g., six months) expiration period is not yet over, the delete request can be rejected. If the artifact to be deleted includes a container image marked as archived and the expiration period is exceeded, the container image and all related artifacts are deleted. After a set (e.g., one-year) archiving period expires, the artifact operator deletes the container image and all related artifacts. All delete operations purge the artifacts from the registry engine and the metadata from the metadata store, but the respective data in the audit log service remains. That is, the existence of that container image can be traced back even after the container image has been deleted.

At 314, the metadata associated with the updated artifact is identified and updated. For example, in response to successful validation, the validation rule engine inserts or updates the collected or generated metadata in the metadata store and transmit the update to the audit log service. The organization has been informed that a parent container image, used by many application container images in the organization, has a severe security issue. All affected application container images can be identified, and their owners can be informed. All members of the organizations security team have the controller role in the system. One security team member gets the task to find all valid and marked as "productive" container images that are based on the parent container image in question. The security team member authenticates with the system. The implementation provides an easy-to-use web interface for the systems Query engine 114, which the security team member uses to collect the necessary data. The security team member flags all identified container images as "insecure". The flagging triggers the Event Service to send out notifications to the container image owners. The security team decided against marking all affected container images as invalid as the request can break running applications until hotfixes are deployed. As another example, the organization wants to introduce a new compliance rule, which requires a set of annotations being set on all productive (valid) container images. A task force of the organizations compliance team gets the controller role in the system. One of the task force members authenticates with the system and uses the Query engine to identify all container images, which currently do not comply with the new compliance rule. The task force member then creates a report based on that query, which can be executed once a week and the output can be forwarded to the task force members. Based on that report, container image owners are regularly reminded to transmit new container images that comply with the new rules.

At 316, the updated metadata is stored by using the metadata operator. For example, if a container image owner authenticates with the system and archives a container image, which was in production before, the metadata operator can modify a value of the metadata stored in the metadata store. If a container image is marked as invalid, the validation rule engine limits read access to the associated metadata to container image owners. The metadata operator can communicate with the artifact operator to control metadata updates and artifact updates related to the transfer, the change, and the moves of the container image and all related artifacts.

At 318, a notification related to the updated metadata is generated, by an event service (e.g., event service 140 described with reference to FIG. 1B). The notifications can include updates about the artifacts and events associated to the artifacts to be transmitted to verified subscribers, such as a container image owner who can be notified via the event service. The registry infrastructure can trigger an event in the event service to notify that the container image can be ready for consumption.

The example process 300 enables optimization of the container image distribution process, providing matching compliance and security for storage and distribution of software artifacts using the OCI and Docker distribution specifications. The described implementations of the example process 300 can be implemented by using additional metadata to add, update, correct, and query the respective metadata. The metadata is accessible for updates over the lifetime of the artifact, which are made visible to all customers identified for using the upgrades of the distributed software applications. The visibility of the distribution process, enables elimination of distribution process uncertainties, minimizing incidents and optimizing computational resources involved in mitigating container image issues. The metadata may be reduced or expanded, for example, based on data retrieved from other internal and/or external sources. Metadata may be adapted before it gets stored to, for example, save space, normalize the data, make it more findable, speed up rule evaluation, and/or comply with legal regulations. The metadata can be extracted synchronously with the validation of the artifact or asynchronously with the validation of the artifact to optimize the example process 300.

Figure 4:
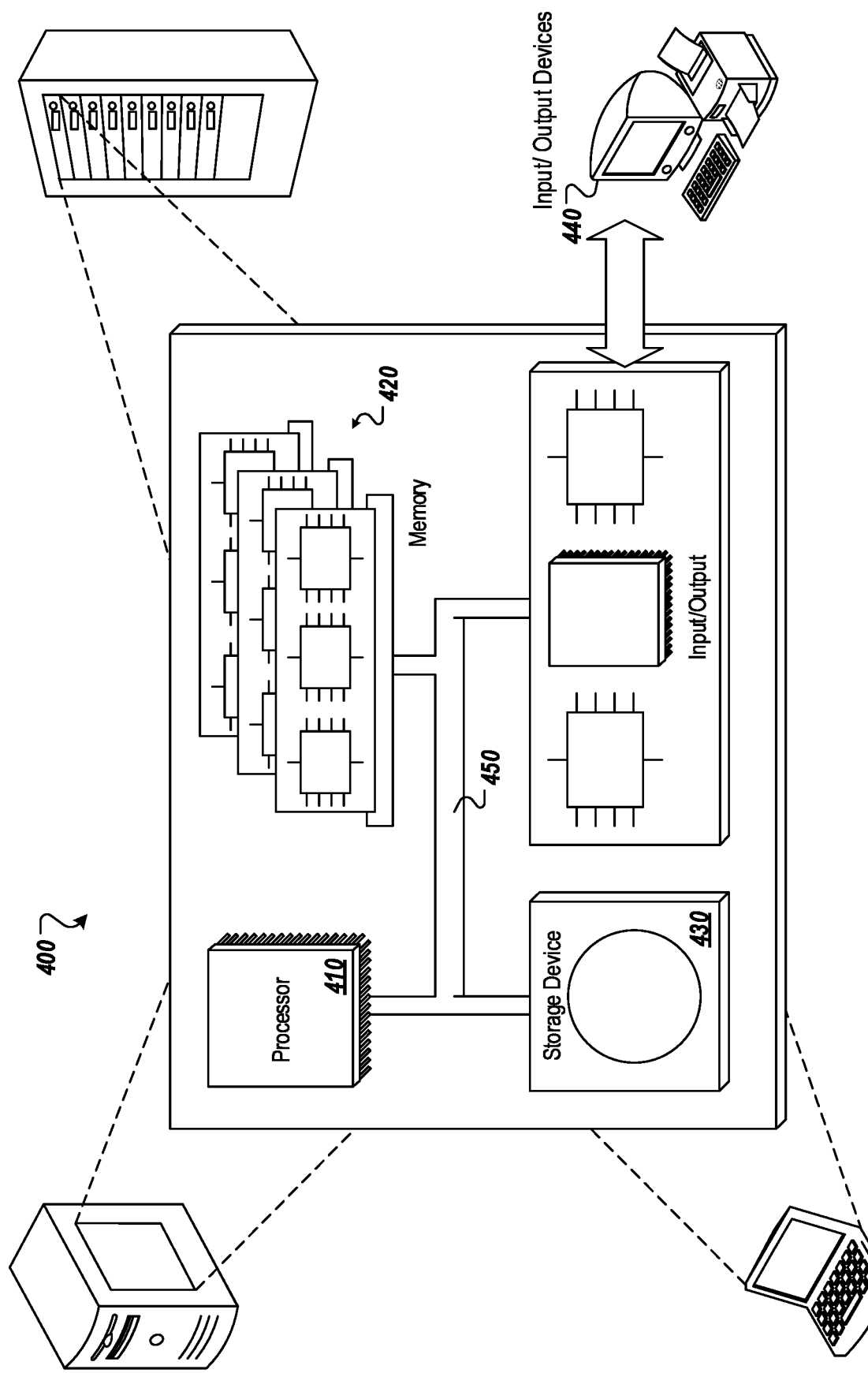
FIG. 4 depicts a diagram illustrating a computing system, in accordance with some example implementations.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or implementations are set forth in the following numbered examples:

Example 1: A system comprising: at least one data processor; and at least one memory storing instructions, which when executed by the at least one data processor, cause operations comprising: receiving, by one or more processors, an artifact comprising a container image; retrieving, by the one or more processors, a plurality of validation rules for performing a validation of the artifact; extracting, by the one or more processors, metadata from the artifact for performing the validation of the artifact; performing the validation of the artifact by processing the container image using the plurality of validation rules and the metadata; and storing, by the one or more processors, the metadata of the artifact, at a database of a registry, wherein the metadata is accessible for updates over a lifetime of the artifact.

Example 2: The system of example 1, wherein the artifact comprises a multidimensional binary object.

Example 3: The system of any one of the preceding examples, wherein the metadata is extracted synchronously with the validation of the artifact or asynchronously with the validation of the artifact.

Example 4: The system of any one of the preceding examples, wherein the operations further comprise: determining, by the one or more processors, a related artifact; and updating, by the one or more processors, the related artifact based on the updates over the lifetime of the artifact.

Example 5: The system of any one of the preceding examples, wherein the metadata is reduced according to one or more security rules before being stored in the database.

Example 6: The system of any one of the preceding examples, wherein the updates over the lifetime of the artifact are stored in an audit record.

Example 7: The system of any one of the preceding examples, wherein the operations further comprise: generating notifications comprising updates about the artifacts and events associated to the artifacts to be transmitted to verified subscribers.

Example 8: A computer-implemented method comprising: receiving, by one or more processors, an artifact comprising a container image; retrieving, by the one or more processors, a plurality of validation rules for performing a validation of the artifact; extracting, by the one or more processors, metadata from the artifact for performing the validation of the artifact; performing the validation of the artifact by processing the container image using the plurality of validation rules and the metadata; and storing, by the one or more processors, the metadata of the artifact, at a database of a registry, wherein the metadata is accessible for updates over a lifetime of the artifact.

Example 9: The computer-implemented method of example 8, wherein the artifact comprises a multidimensional binary object.

Example 10: The computer-implemented method of any one of the preceding examples, wherein the metadata is extracted synchronously with the validation of the artifact or asynchronously with the validation of the artifact.

Example 11: The computer-implemented method of any one of the preceding examples, further comprising: determining, by the one or more processors, a related artifact; and updating, by the one or more processors, the related artifact based on the updates over the lifetime of the artifact.

Example 12: The computer-implemented method of any one of the preceding examples, wherein the metadata is reduced according to one or more security rules before being stored in the database.

Example 13: The computer-implemented method of any one of the preceding examples, wherein the updates over the lifetime of the artifact are stored in an audit record.

Example 14: The computer-implemented method of any one of the preceding examples, further comprising: generating notifications comprising updates about the artifacts and events associated to the artifacts to be transmitted to verified subscribers.

Example 15: A non-transitory computer-readable storage medium comprising programming code, which when executed by at least one data processor, causes operations comprising: receiving, by one or more processors, an artifact comprising a container image; retrieving, by the one or more processors, a plurality of validation rules for performing a validation of the artifact; extracting, by the one or more processors, metadata from the artifact for performing the validation of the artifact; performing the validation of the artifact by processing the container image using the plurality of validation rules and the metadata; and storing, by the one or more processors, the metadata of the artifact, at a database of a registry, wherein the metadata is accessible for updates over a lifetime of the artifact.

Example 16: The non-transitory computer-readable storage medium of example 15, wherein the artifact comprises a multidimensional binary object.

Example 17: The non-transitory computer-readable storage medium of any one of the preceding examples, wherein the metadata is extracted synchronously with the validation of the artifact or asynchronously with the validation of the artifact.

Example 18: The non-transitory computer-readable storage medium of any one of the preceding examples, wherein the operations further comprise: determining, by the one or more processors, a related artifact; and updating, by the one or more processors, the related artifact based on the updates over the lifetime of the artifact.

Example 19: The non-transitory computer-readable storage medium of any one of the preceding examples, wherein the metadata is reduced according to one or more security rules before being stored in the database, and wherein the updates over the lifetime of the artifact are stored in an audit record.

Example 20: The non-transitory computer-readable storage medium of any one of the preceding examples, wherein the operations further comprise: generating notifications comprising updates about the artifacts and events associated to the artifacts to be transmitted to verified subscribers.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system comprising:
one or more processors; and
at least one memory storing instructions, which when executed by the one or more processors, cause operations comprising:
receiving, by the one or more processors, an artifact comprising a container image including a static file of executable code that creates a container on a computing system when the executable code is executed;
in response to receiving the artifact, processing, by the one or more processors, the container image, wherein the processing of the container image includes operations synchronously performed by the one or more processors comprising:
extracting metadata from the artifact comprising the container image; and
performing a validation of the artifact according to a plurality of the validation rules;
storing, by the one or more processors, the metadata of the artifact, at a database of a registry, wherein the metadata is accessible for updates over a lifetime of the artifact;
causing, by the one or more processors, a metadata update to the metadata associated with the artifact comprising the container image; and
generating, by the one or more processors, a notification indicating the metadata update for the artifact to enable transmission to one or more subscribers of an event service,
wherein the plurality of validation rules comprise one or more checking rules to at least check the artifact, one or more metadata extraction rules to extract the metadata from the artifact, and one or more metadata update rules to update the metadata associated with the artifact.

2. The system of claim 1, wherein in response to the artifact validation indicating the artifact is invalid, causing, based on the plurality of validation rules, the artifact to be moved or deleted from the database of the registry, causing the metadata update for the metadata associated with the artifact, and generating the notification to indicate the move or deletion of the artifact.

3. The system of claim 2, wherein the operations further comprise:
in response to the artifact validation indicating the artifact is invalid, determining, by the one or more processors and based on a signature, a related artifact; and
causing the related artifact to be moved or deleted from the database of the registry, causing the metadata update for the metadata associated with the related artifact, and generating the notification to indicate the move or deletion of the related artifact.

4. The system of claim 1, wherein the metadata is reduced according to one or more security rules before being stored in the database.

5. The system of claim 1, wherein the updates over the lifetime of the artifact are stored in an audit record.

6. A computer-implemented method comprising:
receiving, by the one or more processors, an artifact comprising a container image including a static file of executable code that creates a container on a computing system when the executable code is executed;
in response to receiving the artifact, processing, by the one or more processors, the container image, wherein the processing of the container image includes operations synchronously performed by the one or more processors comprising:
extracting metadata from the artifact comprising the container image; and
performing a validation of the artifact according to a plurality of the validation rules;
storing, by the one or more processors, the metadata of the artifact, at a database of a registry, wherein the metadata is accessible for updates over a lifetime of the artifact;
causing, by the one or more processors, a metadata update to the metadata associated with the artifact comprising the container image; and
generating, by the one or more processors, a notification indicating the metadata update for the artifact to enable transmission to one or more subscribers of an event service,
wherein the plurality of validation rules comprise one or more checking rules to at least check the artifact, one or more metadata extraction rules to extract the metadata from the artifact, and one or more metadata update rules to update the metadata associated with the artifact.

7. The computer-implemented method of claim 6, wherein in response to the artifact validation indicating the artifact is invalid, causing, based on the plurality of validation rules, the artifact to be moved or deleted from the database of the registry, causing the metadata update for the metadata associated with the artifact, and generating the notification to indicate the move or deletion of the artifact.

8. The computer-implemented method of claim 6, further comprising:
in response to the artifact validation indicating the artifact is invalid, determining, by the one or more processors and based on a signature, a related artifact; and
causing the related artifact to be moved or deleted from the database of the registry, causing the metadata update for the metadata associated with the related artifact, and generating the notification to indicate the move or deletion of the related artifact.

9. The computer-implemented method of claim 6, wherein the metadata is reduced according to one or more security rules before being stored in the database.

10. The computer-implemented method of claim 6, wherein the updates over the lifetime of the artifact are stored in an audit record.

11. A non-transitory computer-readable storage medium comprising programming code, which when executed by one or more processors, causes operations comprising:
receiving, by the one or more processors, an artifact comprising a container image including a static file of executable code that creates a container on a computing system when the executable code is executed;
in response to receiving the artifact, processing, by the one or more processors, the container image, wherein the processing of the container image includes operations synchronously performed by the one or more processors comprising:
extracting metadata from the artifact comprising the container image; and
performing a validation of the artifact according to a plurality of the validation rules;
storing, by the one or more processors, the metadata of the artifact, at a database of a registry, wherein the metadata is accessible for updates over a lifetime of the artifact;
causing, by the one or more processors, a metadata update to the metadata associated with the artifact comprising the container image; and
generating, by the one or more processors, a notification indicating the metadata update for the artifact to enable transmission to one or more subscribers of an event service,
wherein the plurality of validation rules comprise one or more checking rules to at least check the artifact, one or more metadata extraction rules to extract the metadata from the artifact, and one or more metadata update rules to update the metadata associated with the artifact.

12. The non-transitory computer-readable storage medium of claim 11, wherein in response to the artifact validation indicating the artifact is invalid, causing, based on the plurality of validation rules, the artifact to be moved or deleted from the database of the registry, causing the metadata update for the metadata associated with the artifact, and generating the notification to indicate the move or deletion of the artifact.

13. The non-transitory computer-readable storage medium of claim 11, wherein the operations further comprise:
in response to the artifact validation indicating the artifact is invalid, determining, by the one or more processors and based on a signature, a related artifact; and
causing the related artifact to be moved or deleted from the database of the registry, causing the metadata update for the metadata associated with the related artifact, and generating the notification to indicate the move or deletion of the related artifact.

14. The non-transitory computer-readable storage medium of claim 11, wherein the metadata is reduced according to one or more security rules before being stored in the database, and wherein the updates over the lifetime of the artifact are stored in an audit record.

* * * * *